United States Patent Office 3,533,738
Patented Oct. 13, 1970

3,533,738
PROCESS FOR THE PREPARATION OF SYNTHETIC MULLITE
Clark A. Rundell, Silver Spring, John A. Kwedar, Baltimore, and Heyman C. Duecker, Rockville, Md., assignors to W. R. Grace & Co., New York, N.Y., a corporation of Connecticut
No Drawing. Filed Dec. 16, 1968, Ser. No. 784,243
Int. Cl. C01b 33/26
U.S. Cl. 23—110                                                    4 Claims

ABSTRACT OF THE DISCLOSURE

A process for the preparation of synthetic mullite having the formula $3Al_2O_3 \cdot 2SiO_2$ by cogellation of solutions of salts of silica and alumina wherein the silica to alumina molar ratios range from 0.7 to 3.0. The material recovered from the cogellation is spray dried, washed free of salts, and crystallized to form the mullite.

---

Mullite is a naturally occurring crystalline aluminosilicate that derives its name from the fact that the natural material is found on the Isle of Mull. It has the formula $3Al_2O_3 \cdot 2SiO_2$ and since it is a crystalline material has a well-defined X-ray diffraction pattern.

Mullite has a variety of uses. It is a very desirable refractory material because it consists of closely interlocked crystals which give a good mechanical strength. It contains no glassy material that is liable to drain out of the refractory in service as a result of fusibility being lowered by external chemical attack. The surface and poor volume characteristics of the synthetic crystalline mullite of our invention are such that it is desirable as a base for various catalysts, particularly petroleum cracking catalysts.

Mullite has been prepared by calcination of kaolin, kyanite or sillimanite. The product recovered from these reactions is a residue of silica usually in the form of the glassy matrix. Prior attempts to prepare a refractory grade mullite by reacting the correct quantity of alumina with excess silica result in a mixture of mullite, corundum and silica.

We have found that a synthetic mullite having desirable physical properties can be prepared by cogelling solutions of salts of silica and alumina followed by drying, such as spray drying, washing, and crystallization. The product recovered can have a surface area as high as about 120 square meters per gram.

The first step in our process is the selection of sources of raw materials. Because of economic factors, the preferred source of silica is the alkali metal silicates. Sodium silicate is the least expensive of these materials and is thus preferred. We prefer to use a monomeric silica $Na_2SiO_2 \cdot 5H_2O$ in the preparation of our mullite product. However, other sources of silica such as silica sols can be used and ammonium silicates will give satisfactory results.

The source of alumina can be any soluble inorganic or organic aluminum salt. The alkali metal aluminates can be used, with sodium aluminate being preferred. The other inorganic aluminum salts also give satisfactory results. Examples of these salts include the sulfate, the chloride, and the nitrate. Aluminum salts containing an organic radical such as basic aluminum acetate, for example, also give satisfactory results.

After the reactants are selected, they are mixed together to form the cogel. The most satisfactory method of adjusting the amount of each of these reactants is to add the proper amount to give a pH in the desired range. We have found that best results are obtained when the pH of the cogellation mixture is in the range of 6 to 7.

Since the excess of any of the salts is washed out after the spray-drying step, the molar ratio of soda or silica to alumina is not critical. Satisfactory results have been obtained in the three solution cogellation methods with a silica-alumina molar ratio of from about 0.6 to 1 with about 0.62 to 0.8 being preferred. In the two solution cogellation, satisfactory results have been obtained with a silica-alumina ratio of about 0.60 to about 3 with ratios of 0.60 to 1 being preferred.

In the next step of our process, the cogelled material is dried. The most convenient method of accomplishing this drying is spray drying. Spray driers are well known and widely used pieces of apparatus. When necessary, the cogel is dewatered and fed to a spray dryer operating at an inlet temperature of 1000° F. and an outlet temperature of 500° F. The product recovered from the spray dryer is washed with water to remove dissolved salts and then subjected to an ion exchange step to remove the majority of the sodium ions present. The ion exchange step is carried out by slurrying the hydrogel with 5% solution of ammonium sulfate, heated to temperatures of about 80 to 100° C., preferably about 90° C. The hydrogel is washed between the exchanges. The sodium content of the mullite precursor can be reduced to as low as 0.2% in two exchange steps.

The final step of our process is the crystallization step. In this step, the hydrogel is dried in a forced-draft oven at 110° C. for a period of about 3 hours and then calcined at temperatures of from about 900 to 1400° C. for times ranging from 60 hours to 5 minutes. The mullite product recovered ranges from microcrystalline to very crystalline materials depending on the time and temperature of the calcination. Temperature is more important than time. Calcination at 900° C. for periods of up to 60 hours yields only what would be considered a microcrystalline material in that the crystallite size is less than 1000 angstroms. However, increasing the temperature to 1200 to 1400° C. for 60 hours would give a product made up of crystallites in the 1000 to 3000 angstrom size range. The material we designate as very crystalline.

Our invention is further illustrated by the following specific but non-limiting examples.

EXAMPLE 1

This example illustrates the three solution gellation technique.

Solutions of sodium silicate, sodium aluminate, and aluminum nitrate were prepared and designated Solutions A, B, and C, respectively. Solution A, the silicate solution, was prepared by adding 27.6 lbs. of $Na_2SiO_3 \cdot 5H_2O$ and 10.6 lbs. of sodium hydroxide to 12.5 gallons of water. In the preparation of Solution B, 9.82 lbs. of alumina trihydrate ($Al_2O_3 \cdot 3H_2O$) and 10.6 lbs. of sodium hydroxide pellets were dissolved in 13½ gal. of water. Solution C was prepared by dissolving 83.25 lbs. of aluminum nitrate $(Al(NO_3)_3 \cdot 9H_2O)$ in 19.2 gal. of water. The three solutions were mixed simultaneously at feed rates of about 230 ml. per minute for Solutions A and B and 500 ml. per minute for Solution C. Sufficient quantities were mixed to give a final pH of 6.6 to 7. Solutions A and C were heated prior to mixing. The product was spray dried within 1½ hours and washed with ammonium sulfate. After two exchanges, the product was dried and analyzed. The silica to alumina ratio was 0.792. This product was dried at 110° C. in a forced-draft oven and calcined at temperature of about 1150 to 1250° C. for 1.5 hours. The product had the typical mullite X-ray diffraction pattern as set out in the table below:

Table I

| d. A. | $I/I_0$ |
|---|---|
| 5.39 | 50 |
| 3.43 | 95 |
| 3.39 | 100 |
| 2.89 | 20 |
| 2.69 | 40 |
| 2.54 | 50 |
| 2.29 | 20 |
| 2.21 | 60 |
| 2.12 | 25 |
| 1.60 | 20 |
| 1.52 | 35 |

EXAMPLE 2

This example illustrates the preparation of the mullite by a two solution cogellation technique.

Solutions of aluminum nitrate and sodium silicate were mixed together at temperature of between 25–100° C. In the first of these runs, two solutions of A and B were prepared; Solution A was the silicate solution and Solution B was the solution of aluminum nitrate.

The silicate solution, A, was prepared by dissolving 27.7 lbs. of sodium silicate ($Na_2SiO_3 \cdot 5H_2O$) and 39.7 lbs. of sodium hydroxide pellets in 25 gal. of water. Solution B was prepared by mixing 148.5 lbs. of aluminum nitrate ($Al(NO_3)_3 \cdot 9H_2O$) in 16.82 gal. of water. The solutions were mixed in the hydrous oxide reactor at 98° C. at feed rates of 397 cc. per gram for Solution A and 445 cc. per gram for Solution B. The pH of the effluent was maintained at 6.85 throughout the mixing. The product was spray dried within 1 to 1½ hours after mixing. The spray-dried hydrogel was washed six times. A total of 10 kilograms of the hydrogel was washed with about 24 liters of water and filtered between each wash. A total of 4100 grams of the hydrogel was ion exchanged with ammonium sulfate by slurrying it three times for 15 minutes in different three gallon portions of 5% ammonium sulfate solution heated to a temperature of 80 to 90° C. The hydrogel was washed between exchanges with 5 gal. portions of water, followed by two washings after the final ammonium sulfate treatment. The $Na_2O$ content of the final product is 0.2%.

The washed gel was calcined at 1200° C. for 1 hour and 26 minutes. The product had the surface area of 73.5 square meters per gram. The size of the mullite crystallites as calculated was about 1000 angstroms.

Obviously, many modifications and variations of the invention may be made without departing from the essence and scope thereof and only such limitations should be applied as are indicated in the appended claims.

What is claimed is:

1. A process for preparing a synthetic mullite comprising the steps of:
   (a) preparing a solution of sodium silicate,
   (b) preparing a solution of an inorganic or organic salt of alumina,
   (c) forming a cogel by rapidly mixing the solutions in amounts sufficient to provide a molar ratio of silica to alumina of about 0.6 to 1, and a pH of 6 to 7,
   (d) spray drying the cogel in a spray drier operated at an inlet temperature of 1000° F. and an outlet temperature of 500° F.,
   (e) washing the spray dried product and reducing the sodium content by exchange with an ammonium sulfate solution,
   (f) crystallizing the product to a product having crystallites of 1000 to 3000 angstroms by heating to about 1200 to 1400° C. for about 60 hours, and
   (g) recovering the crystalline mullite product.

2. The process according to claim 1 wherein the aluminum source is an inorganic aluminum salt solution.

3. A process for preparing synthetic mullite which comprises the steps of:
   (a) preparing a source of silica comprising silica sol or a solution of sodium silicate,
   (b) preparing a solution of an inorganic or organic aluminum salt,
   (c) forming a cogel by rapidly mixing the two solutions in an amount sufficient to provide a molar ratio of silica to alumina of about 0.6 to 1, and a pH of 6 to 7,
   (d) spray drying the cogel in a spray drier operated at an inlet temperature of 1000° F. and an outlet temperature of 500° F.
   (e) reducing the sodium content of the spray-dried product by exchange with an ammonium sulfate solution,
   (f) crystallizing the washed, spray-dried product to a microcrystalline product by calcination at temperatures of about 900° C. for about 60 hours, and
   (g) recovering the microcrystalline mullite product.

4. The process according to claim 3 wherein the alumina is furnished by a solution of aluminum nitrate and the silica to alumina ratio in the reactant mixture is from 0.60 to 1 to 1.0 to 1.

References Cited

UNITED STATES PATENTS

| 1,741,920 | 12/1929 | Curtis | 23—110 XR |
| 2,232,727 | 2/1941 | Peterkin et al. | 23—110 XR |
| 2,428,895 | 10/1947 | Shoeld | 23—110 XR |
| 2,678,282 | 5/1954 | Jones | 23—110 XR |
| 2,688,003 | 8/1954 | Ryland | 23—110 XR |
| 3,366,445 | 1/1968 | Einstein | 23—110 |
| 3,459,501 | 8/1969 | Plank et al. | 23—112 |
| 3,460,904 | 8/1969 | Young | 23—112 |

FOREIGN PATENTS 1,068,232  11/1959  Germany.

EDWARD STERN, Primary Examiner

U.S. Cl. X.R.

23—112; 106—65